United States Patent
Bietsch et al.

(10) Patent No.: US 7,504,038 B2
(45) Date of Patent: Mar. 17, 2009

(54) SYSTEM, METHOD, AND APPARATUS FOR MECHANICALLY RELEASABLE SLIDER PROCESSING INCLUDING LAPPING, AIR BEARING PATTERNING, AND DEBONDING

(75) Inventors: Alexander Bietsch, Rueschlikon (CH); Michael W. Chaw, San Jose, CA (US); Ashok Lahiri, Cupertino, CA (US); Bruno Michel, Adliswil (CH); Mark C. Thurber, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 575 days.

(21) Appl. No.: 10/788,145

(22) Filed: Feb. 26, 2004

(65) Prior Publication Data
US 2005/0191582 A1 Sep. 1, 2005

(51) Int. Cl.
    *B44C 1/22* (2006.01)
(52) U.S. Cl. ......................... 216/22; 430/311; 430/322; 451/364; 451/41
(58) Field of Classification Search ................. 216/22; 430/311, 322; 451/364, 41
    See application file for complete search history.

(56) References Cited

U.S. PATENT DOCUMENTS

| | | | |
|---|---|---|---|
| 5,371,654 A | 12/1994 | Beaman et al. | |
| 5,635,846 A | 6/1997 | Beaman et al. | |
| 5,747,139 A * | 5/1998 | Schenz | 428/120 |
| 5,932,113 A | 8/1999 | Kurdi et al. | |
| 5,947,750 A | 9/1999 | Alcoe et al. | |
| 6,133,072 A | 10/2000 | Fjelstad | |
| 6,736,978 B1 * | 5/2004 | Porter et al. | 210/695 |
| 6,926,582 B2 * | 8/2005 | Beckle et al. | 451/5 |
| 7,077,970 B2 * | 7/2006 | Buchan et al. | 216/22 |
| 2003/0133229 A1 * | 7/2003 | Lille | 360/245.3 |
| 2004/0121066 A1 * | 6/2004 | Anderson et al. | 427/2.11 |
| 2004/0185753 A1 * | 9/2004 | Beaucage et al. | 451/28 |
| 2004/0223256 A1 * | 11/2004 | Feng et al. | 360/122 |
| 2005/0276997 A1 * | 12/2005 | Hasegawa et al. | 428/811.3 |

FOREIGN PATENT DOCUMENTS

JP 2000238118 * 5/2000

OTHER PUBLICATIONS

Heiko O. Jacobs and George M. Whitesides, "Submicrometer Patterning of Charge in Thin-Film Electrets", Science, vol. 291, Mar. 2, 2001, www.sciencemag.org.

(Continued)

*Primary Examiner*—Nadine G Norton
*Assistant Examiner*—Mahmoud Dahimene
(74) *Attorney, Agent, or Firm*—Bracewell & Giuliani LLP

(57) ABSTRACT

A mechanically releasable slider process utilizes silicone rubber or PDMS to take the function of a planarization material for individual sliders or slider rows. Mechanical debonding takes advantage of the rubber-elastic property of PDMS. A gripper is used in a virtually solvent-free, air bearing patterning UV-molding process and resist-based processes. A PDMS-based fixture is used during both the lapping process and the photo or UV-mold patterning of the ABS surface. This fixture can mechanically hold sliders by large area reversible adhesion while allowing gimbaling, electrical connection, actuation, UV-molding or photolithography, and mechanical release, thus reducing the number of slider manipulations to two.

22 Claims, 7 Drawing Sheets

OTHER PUBLICATIONS

Heinz Schmid, Heiko Wolf, Rolf Allenspach, Heike Riel, Siegfried Karg, Bruno Michel, and Emmanuel Delamarche, "Preparation of Metallic Films on Elastomeric Stamps and Their Application for Contact Processing and Contact Printing", Advanced Function Materials, 2003, 13, No. 2, February, Wiley-VCH Verlag GmbH & Co. KgaA, Weinheim, 1616-301X030202-0153, pp. 145-153.

Matthew Colburn, Annette Grot, Byung Jin Choi, Marie Amistoso, Todd Bailey, S.V. Sreenivasan, John G. Ekerdt, and C. Grant Willson, "Patterning nonflat substrates with a low pressure, room temperature, imprint lithography process", American Vacuum Society, J. Vac. Sci. Technol. B 19(6), Nov./Dec. 2001, pp. 2162-2172.

Alexander Bietsch and Bruno Michel, "Conformal contact and pattern stability of stamps used for soft lithography", American Institute of Physics, Journal of Applied Physics, vol. 88, No. 7, Oct. 1, 2000, pp. 4310-4318.

* cited by examiner

SYSTEM, METHOD, AND APPARATUS FOR MECHANICALLY RELEASABLE SLIDER PROCESSING INCLUDING LAPPING, AIR BEARING PATTERNING, AND DEBONDING

BACKGROUND OF THE INVENTION

1. Technical Field

The present invention relates in general to improved slider processing and, in particular, to an improved system, method, and apparatus for integrating lapping, air bearing patterning, and debonding in a releasable slider processing fixture.

2. Description of the Related Art

Current hard disk drive technology is continually being pushed to higher levels of density and speed concomitant with downward pressures on cost. The ability to efficiently design, evaluate, improve, and subsequently fabricate pole tip geometry, air-bearing sliders, and suspensions is deemed critical for success in keeping up with these demands. The main contributor to manufacturing cost is the lapping process with its associated need for handling of individual sliders to (a) place sliders in the lapping fixture, and to (b) transfer the rows or individual sliders from the lapping fixture to a carrier for subsequent photo-patterning.

The current preference for the individual slider based process is due the limited accuracy and the limited yield of the row based lapping process. A two-step process is used mainly because of capacity limitations of the lapping actuator (typically, less than 60 sliders—or one row—can be processed at once), and because the two-step process allows elimination of bad sliders before the photo-process. Currently, air bearing patterning of the air-bearing surface of read-write heads is a multi-step photo-patterning process with limited yield and chronic reliability problems. The main contributors to the problems are the bonding process (and associated debonding process) and the planarization material.

Thin film inductive heads and resistive read heads require a very small, constant effective magnetic spacing between their pole tips and the magnetic medium for high density operations. In addition, the pole tips of both heads must be trimmed to the exact length and lateral dimension. In a hard disk drive, this spacing must be kept constant while the head travels with respect to the rotating disk at a relative speed of several meters per second.

Past predictions of the demise of hard disk drive technology due to an anticipated limit in areal density of magnetic recording have been proven wrong because the effective magnetic spacing has been reduced beyond expectations. In addition to improved lithographies, both thin film and lubrication technologies are two main factors that allowed the observed progress. In the future, air bearing processing technology and accurate lapping while fully monitoring the electrical properties during the lapping process, will be crucial for further progress. However, the overall task is becoming more challenging, mainly because of excessive pressure to reduce the cost associated with this highly accurate processing.

Air bearings are the most efficient means to guarantee constant spacing, even at variable operation modes caused by the head descending from the headrest, during large external acceleration, temperature, humidity, and pressure changes. An air bearing is a carefully designed airfoil on the disk facing side of the physical structure carrying both the read and write head. The disk-facing side of this structure called slider must be patterned with high accuracy so that the airfoil meets the required specifications.

Slider lapping is needed to trim the read sensor to its final shape such that the resistance of the giant magneto-resistance element is within specifications. At the same time, the pole tip of the write head must be shortened and trimmed to its optimal size. Depending on the choice of the lapping conditions, the read-and-write pole tips are either directly coplanar with the ceramic surface or slightly recessed. This job can only be performed optimally when the endpoint of the lapping can be detected electrically and the process stopped after having reached the specified value.

Lapping is currently performed on a row of sliders containing approximately 40 to 60 sliders while only detecting the endpoint of a subset of reference sliders. Due to the warping and twisting of the row, the yield of this process is very low. Competing approaches now use shorter rows of sliders containing only about six sliders where all sliders are monitored. To allow mechanical addressing of individual sliders, rows are pre-parted such that they can be bent and twisted more easily. This allows an actuation of individual sliders with only minor cross talk to neighboring sliders. However, this process is not optimal because of the cross talk among sliders and because the small numbers of sliders that can be processed at once compared to the 40+ slider rows.

A final improvement of the pending accuracy problems could be achieved through a movement to individual slider lapping. To make this process economically more viable than current processes, more than six sliders or preferably even more than 40 sliders should be processed at once on one lapping machine. This requires a complex fixture with multiple grippers, connectors, and actuators. Miniaturized actuators for slider lapping use electromagnetic principles and are typically spaced at about one inch. Other types of actuators could be built using piezo-actuation or thermal actuation, but the fixtures would be expensive and difficult to miniaturize at the levels required for dense processing of pico and femto-format sliders with a pitch of less than 1.5 mm.

Prior to lapping, the putative ABS surface is polished to a high quality and lapping is only used to improve the surface quality while optimizing the pole tip geometry. The lapped surface must be exactly co-planar with the existing polished surface. Because gripping of small pieces like sliders cannot be done with such co-planarity, the lapping fixture requires a freedom to tilt in two directions of space according to the existing reference surface, which is a process known as gimbaling. Lapping of several sliders at once requires individual gimbaling in addition to the end point detection and actuation mentioned above.

One of the major problems of the current air bearing patterning process is the removal and cleaning of the sliders (both individual sliders and slider rows) from the carrier. During the bonding process, the sliders or rows are fixed to the carrier using a UV-curable acrylate. The solvent resistance against typical solvents needed during photo-patterning steps dominates the choice of this material. The same boundary condition applies to the planarization material. This material is also required to survive the photo-patterning steps for the formation of the air-bearing surface (ABS) of the sliders.

However, the solvent resistance is a major obstacle during the removal or debonding phase. Strongly-cured polymer networks are insoluble in all commercially accessible solvents and only can be removed by a process that combines strong swelling of the polymer with mechanical abrasion. Typical solvents used for this swelling-based removal are hot N-methyl pyrrolidone (NMP) or hot PGMEA. Mechanical abrasion is induced by a jet of soda particles (soda blast) or by rotating brush (brush cleaning). The disadvantage of this approach is the creation of sticky particles because swelling renders a polymer sticky and abrasion can tear particles off the matrix. These particles will stick to the active slider surfaces and have to be removed in a cumbersome process that involves a lot of solvent and extended cleaning times.

Use of silicone rubber for replication of complex structures is very widespread in dentistry and art. The process of creating a replica starts with the application of a separating medium to the surface of the article to be replicated (an ultra-thin layer of oil or soap). A room temperature cure or thermal cure silicone elastomer material is then applied such that it covers the entire surface as a thick film. Alternatively, an additional vessel is added around the object such that the void can be filled. The silicone material is then allowed to cure. Separation even of partially-trapped features is possible because the elastic nature of silicone rubber allows large but fully reversible dimensional changes (by a factor of two in many cases).

Currently, the best way to apply separation layers to technological objects made of glass, silicon, or ceramic is the exposure of parts of the surfaces to a vapor of fluorinated trichlorosilanes. Separation from these surfaces is possible without leaving behind macroscopic amounts of materials. At most, a monolayer of silicon oil may be left on the replicated surface. Silicone oils can be removed easily by dissolution in mildly polar solvents.

Swelling of rubbers is inversely proportional to the Young's modulus and depends on the similarity between the polymer network and the solvent (i.e., the gain in entropy when the two systems mix). In the case of poly dimethylsiloxane (PDMS), polar hydrophilic solvents like water or ethanol have a very small tendency to swell PDMS. This tendency can be reduced by using a mechanically stiff PDMS and by kinetically slowing the solvent uptake by means of a diffusion barrier. The simplest diffusion barrier is a thin layer of plasma polymerized PDMS created by a short exposure in a plasma asher.

Creation of electrical contacts through PDMS or along its surface is challenging because the elastic rubber is not compatible with more stable metallic conductors. Two approaches exist that can reliably form and maintain a contact even under slightly variable geometric conditions: (i) surface metallization, and (ii) electrical contacts through PDMS.

Surface metallization, e.g., covering PDMS with metal layers, can create electrical links that maintain contact during mechanical changes. Electrical contacts through PDMS are described in U.S. Pat. Nos. 5,371,654 and 5,635,846. These patents describe a PDMS layer with arrays of tilted or meandering wires. These designs form reliable electrical contacts between geometrically warped surfaces with no need for soldering. The structure is compliant in the vertical dimension and therefore allows multiple assembly and disassembly of chips onto surfaces.

Fabrication of the interconnection package starts from a metallic base onto which an array of wires is bonded and cut at a desired length, preferably tilted with 5 to 60 degrees from the vertical. A ball can be formed on the end of the wire, which is not bonded to the surface, using a laser or an electrical discharge. After the wire bonding process is completed, the substrate is placed in a casting mold and filled with a metered amount of PDMS. The substrate is extracted from the mold after the elastomer is cured. Similar systems are described in U.S. Pat. Nos. 5,947,750 and 6,133,072.

Recent variants of PDMS are mechanically well understood such that materials can be designed to match mechanical requirements. Deformations can be described with a mathematical model using equations of elastic theory to exactly describe this effect. See, e.g., Bietsch and Michel, "Conformal contact and pattern stability of stamps used for soft lithography", J. Appl. Phys. 88, 4310 (2000); Johnson, "Contact Mechanics", Cambridge University Press, Cambridge (1985); and S. P. Timoshenko and J. N. Goodier, "Theory of Elasticity", Mc-Graw-Hill, New York). The mechanics of flat PDMS posts can be controlled such that their geometry changes to allow the front surface to have full areal contact with the substrate—a process known as gimbaling.

PDMS-actuated valves have been described in the context of biosensors where pressurized air can be used to switch a liquid flow. This is done by inflating a cavity in the vicinity of the liquid channel. The increase of pressure in the cavity leads to the collapse of the liquid channel and thus pinches off the flow. This process is reversible and allows many actuation cycles. This type of actuation is not very precise dimensionally, but the control over the force via the air pressure is acceptable.

SUMMARY OF THE INVENTION

One embodiment of a system, method, and apparatus for mechanically releasable slider processing utilizes silicone rubber or poly-dimethylsiloxane (PDMS). These materials can take the function of a planarization material very much the same as other materials when variants of this material with well-defined mechanical properties are used. For example, one embodiment of the present invention uses PDMS as planarization and bonding material of individual sliders or slider rows. Mechanical debonding takes advantage of the rubber-elastic property of PDMS. A gripper constructed in accordance with the invention is most advantageous in a virtually solvent-free, air bearing patterning UV-molding process, but it is also useful in classical resist-based processes as well. In the latter case, harder PDMS variants and diffusion barriers may be used.

In another embodiment, a PDMS-based fixture is used during both the lapping process and the photo or UV-mold patterning of the ABS surface. This fixture can mechanically hold sliders while allowing gimbal, electrical connection, actuation, UV-molding or photolithography, and mechanical release, thus reducing the number of individual slider manipulations to two (1, assembly, 2 mounting arm). The present invention strongly reduces the cost associated with slider lapping and photo-patterning by reducing the number of manipulations. The invention also cures technical problems of the air bearing patterning process. In addition, the mechanical debonding process allows a complete removal of environmentally problematic solvents from the process.

Typical materials used for bonding and planarization are mechanically stiff and brittle materials with a Young's modulus in excess of 300 MPa. The reason for the choice of these materials is a good mechanical stability and a small tendency for solvent swelling. Changing to a softer, rubbery material will inevitably reduce the mechanical stability of the assembly and strongly increase the tendency for solvent swelling. However, the latter issue is no problem when a mechanically strong rubber or compatible solvents are used, or when it becomes possible to devise a virtually solvent-free fabrication process for the ABS surface. Mechanical stability of the assembly, given through large area bonding over the entire lower surface and over all lateral surfaces bonding, is by far strong enough to ensure the positional accuracy of the sliders and to ensure that the sliders cannot part from the assembly in unwanted moments.

The advantage of a rubbery material, however, comes through the very high toughness allowing deformations as large as 100% without brittle failure. This can be used to create fixtures that strongly hold sliders while releasing them under mechanical action. The good holding force is created by the full area contact of the in-situ molded discardable gripper or of the accurately manufactured mold for the reusable gripper.

One embodiment of the present invention comprises a row gripper for fixation and planarization of row carriers in air bearing patterning. Different fabrication schemes for the grippers are demonstrated and envisaged for single use and/or multiple uses. A reusable row or individual slider gripper is fabricated by molding from a template. The template is either an array of sliders or an equivalent. The template is fabricated either by classical milling methods or by MEMS-derived photolithography using thick films of SU-8 resist. The molding templates are then covered with a separation monolayer in a vapor of fluorinated trichlorosilanes. After that, spacers are added and covered by a bendable backplane followed by injection of the liquid pre-polymer.

After curing, the gripper is peeled off the master and bent over a cylinder to open the pockets for the sliders. After loading, the sliders are all leveled by pushing them down with a reference plane. Optionally, the gripping force can be enlarged by diffusing a small amount of solvent into the PDMS ridges between the sliders. This also may help to temporarily reduce sticking between the PDMS and the sliders, thus enabling the vertical sliding of some sliders during the leveling process.

To improve the fixation of the sliders in the fixture, an air chamber may be used instead of solvent swelling. The ABS surface is then patterned using either liquid resist or UV molding and the sample is processed by reactive ion etching or ion milling. Finally, the sliders are released by bending the gripper along a cylinder surface. The gripper is reusable. Problems associated with the reusable gripper may include (i) a lack of alignment between the pole tips of the sliders since the sliders are referenced simply by their outer surface, and (ii) the slipping of sliders out of the fixture during the solvent swelling.

Another embodiment of the present invention comprises an in-situ molded row or individual slider gripper for single use. The two problems associated with the reusable gripper are amended in an approach wherein the gripper is molded in situ for single use on a pre-aligned slider array. To achieve this, rows or individual sliders are assembled to an array with the pole tip facing downward on a PDMS sticky pad in the same way as the currently established process. The sliders are then coated with a fluorinated monolayer by brief exposure to a fluorinated tricholorsilane compound. A spacer and a bendable metallic or glass, or a laminated polymer/glass backplane, are then added to form a sealed mold where thermo curable or UV-curable PDMS is injected. The PDMS layer with the embedded sliders is then peeled off from the assembly pad and transferred and clamped to an air bearing patterning carrier. It is then subject to either several photo-processes or to a UV molding process and the associated reactive ion etching (RIE) or ion mill (IM) etching.

After the ABS surface is finished, the rows or sliders are released from the gripper through mechanical action. The backplane of the carrier is bent under the selected row or slider to reduce the clamping force such that the row or slider is transferred by vacuum tweezers or another suitable robotic transfer device. The economics in terms of cost and throughput for the fabrication of the discardable grippers are better than the current planarization process since the materials cost is lower and the overall effort is comparable to the current planarization process.

A second advantage of the fluorination of rows or sliders is the reduced tendency for particle sticking on these surfaces. Importantly, the rows or sliders can be removed by controlled peeling from the gripper without any remainder left on their surfaces (i.e., no microscopic particles but possibly silicone traces that can be removed by solvent, IM, or RIE). Generally, surface treatment of sliders reduces the need for solvent cleaning or allows the selection of less harmful solvents. The concept described for the row grippers also can be extended to individual sliders in the same manner.

In yet another embodiment, an extended PDMS fixture contains electrical contacts, can provide gimbal tolerance, and allows the design of the actuators. These complex fixtures carry out four basic functions, including gripping/releasing, actuation up/down, electrical contacting, and gimbaling. Molding the fixture from PDMS provides an easy path for miniaturization. The concept allows arrays of, for example, 44×24 to be formed. There are two possible approaches to form and use the fixture: (a) a multi-use lapping and patterning fixture, and (b) a single-use disposable fixture.

In the process carried out with the proposed multi-use fixture, the sliders are assembled on a PDMS sticky pad or an adhesive tape in an array matching the spacing of the fixture. The grippers are then opened by selective solvent swelling and pushed on top of the slider array. After the solvent evaporates and the sliders are solidly gripped, the assembly pad is peeled off and the slider array is transferred to the lapping tool. An alternative to solvent swelling to open the gripper is pressurizing and venting an air chamber to achieve the same result. Another alternative is to open the gripper by pushing down at the vertical actuation limit.

The gripper ensures that all of the electrical contacts to the individual sliders are connected as are the actuation ports for compressed air. The lapping operation is then started with all sliders in contact (i.e. with all sliders actuated to the maximal pressure). As the lapping progresses and some sliders show resistance values close to the specification, the pressure on these sliders is reduced by venting the air pressure. When the specifications are fully reached, the sliders are pulled back to the rearmost position by applying a partial vacuum. After all sliders are finished, the ABS surface is patterned by UV-molding or photo lithography. The loading force for the polymer displacement can be applied globally to the actuation ports. This will compensate for co-planarity variation and allow an efficient molding.

After the resist has been ashed or developed, the sliders are exposed to the reactive ion etching or ion milling steps. Finally, the sliders are released from the fixture by selective swelling (debonding) and mechanically transferred to the final location by a robotic manipulator. The pressurized air actuation is probably the simplest approach for vertical actuation. Another actuation scheme that might be similarly efficient is actuation by a piezo-actuated punch that presses onto the flexible backplane. This piezo-actuator could be used with both multi-use and single use lapping fixtures.

A process with the proposed single-use fixture is similar to the row gripper case, including combined lapping/patterning fixtures that are disposable. This allows a simpler approach to their fabrication. Technically, the disposable gripper is made directly on an array of aligned sliders mounted on a sticky pad. The alignment is done on the pole tips as they are visible after the cutting operation. The advantage of this approach is that the sliders are already aligned in the lapping fixture so that they can be globally processed with a carbon overcoat and in the subsequent lithography.

Similar to the row gripper, a molding process is done using PDMS after all sliders are connected by wire bonds to allow the monitoring of the coil and the read element resistance. The air chamber for actuation is generated in the same molding operation. The fabrication cost of the gripper is dominated by the need for wire bonding between the sliders and electrical wire arrays that are co-molded into the gripper, or by the need for disposable connector arrays that are molded into the fixture. Although the complexity of disposable lapping fixtures may seem high, the overall cost for fabricating a fixture for total processing of 1000 sliders is desirable.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
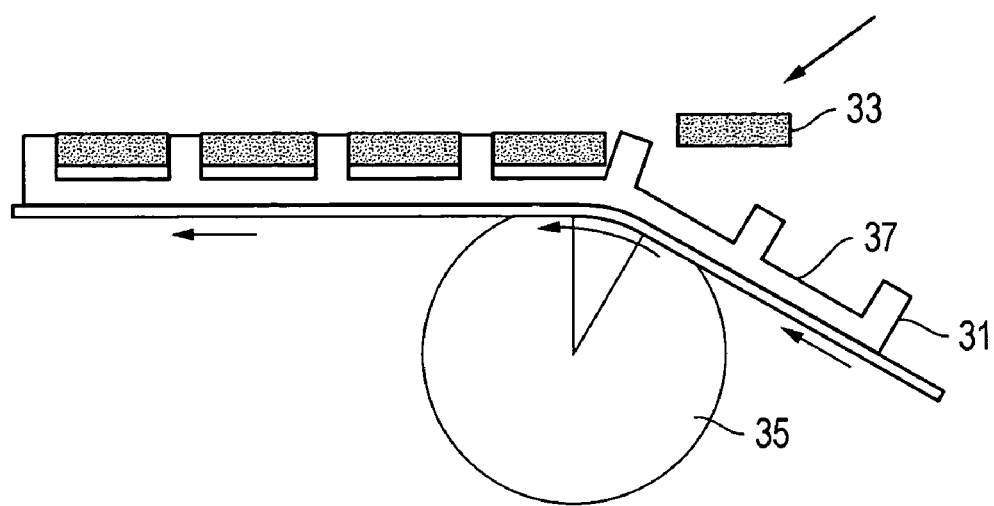
FIG. 1 is a side view of one embodiment of a slider process showing a first step of loading rows and is constructed in accordance with the present invention.
Figure 2:
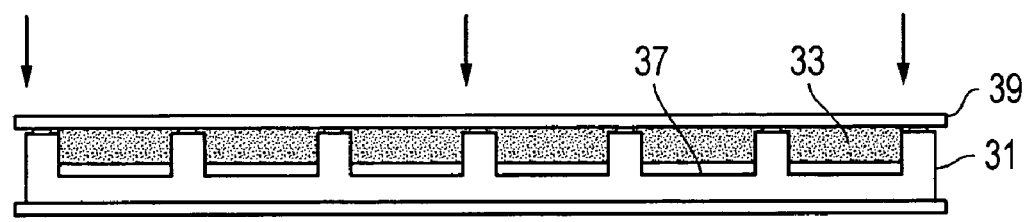
FIG. 2 is a side view of the process of FIG. 1 showing row leveling.
Figure 3:
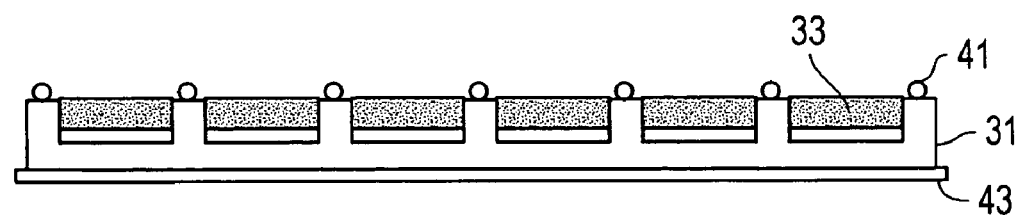
FIG. 3 is a side view of the process of FIG. 1 showing addition of solvent drops.

Referring to FIGS. 1-8, one embodiment of a system, method, and apparatus of the present invention is shown. In this embodiment, a fixture 31 (FIG. 1) is used to process the workpieces 33, and comprises positioning the workpieces in the fixture 31. This is accomplished by elastically deforming the fixture 31 with a cylinder 35 such that pockets 37 in the fixture 31 are opened up to receive the workpieces 33. The workpieces 33 are loaded into the fixture 31 while it is elastically deformed such that the workpieces 33 are mechanically engaged by and retained in the fixture 31. The workpieces 33 are then leveled in the fixture 31 by pushing the workpieces 33 down into the fixture 31 with a reference plane 39 (FIG. 2). The workpieces 33 may be processed in a virtually solvent-free, air bearing patterning UV-molding process.

Figure 4:
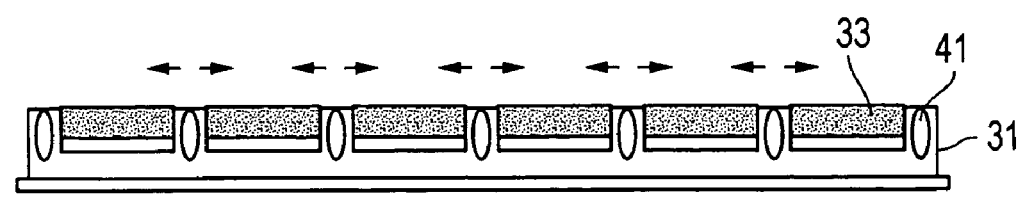
FIG. 4 is a side view of the process of FIG. 1 showing fixation of rows by solvent-induced swelling.

The fixture may be molded from, for example, silicone rubber or poly-dimethylsiloxane (PDMS). For example, the fixture may be molded off of a template that is covered with a separation monolayer in a vapor of fluorinated trichlorosilanes. Spacers are then added to the side of the template to define a mold with defined thickness that is to be covered with a backplane 43 and to be filled with PDMS to create the fixture 31. Clamping of workpieces onto the fixture may also comprise adding solvent 41 (FIG. 3) to the fixture 31 and fixing the workpieces 33 in the fixture 31 by solvent-induced swelling of the fixture 31 (FIG. 4). These adding and fixing steps occur after the leveling step and before the next step. Alternatively, air chambers may be inflated in or adjacent to the fixture 31 to improve fixation of the workpieces 33 in the fixture 31.

Figure 5:
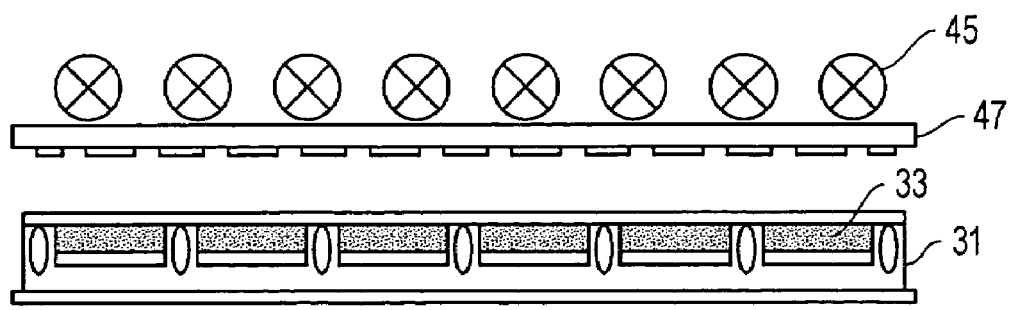
FIG. 5 is a side view of the process of FIG. 1 showing spincoat and projection lithography or UV molding lithography.
Figure 6:
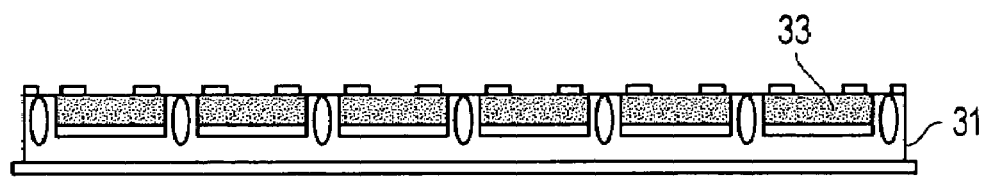
FIG. 6 is a side view of the process of FIG. 1 showing development of resist.
Figure 7:
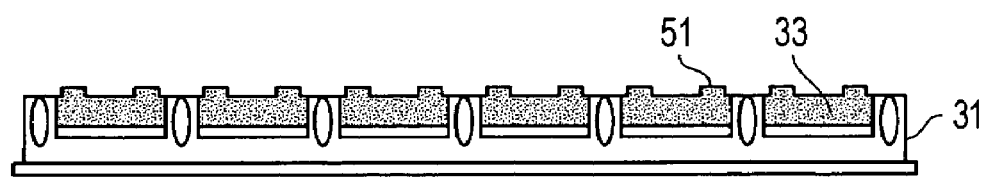
FIG. 7 is a side view of the process of FIG. 1 showing further processing.
Figure 8:
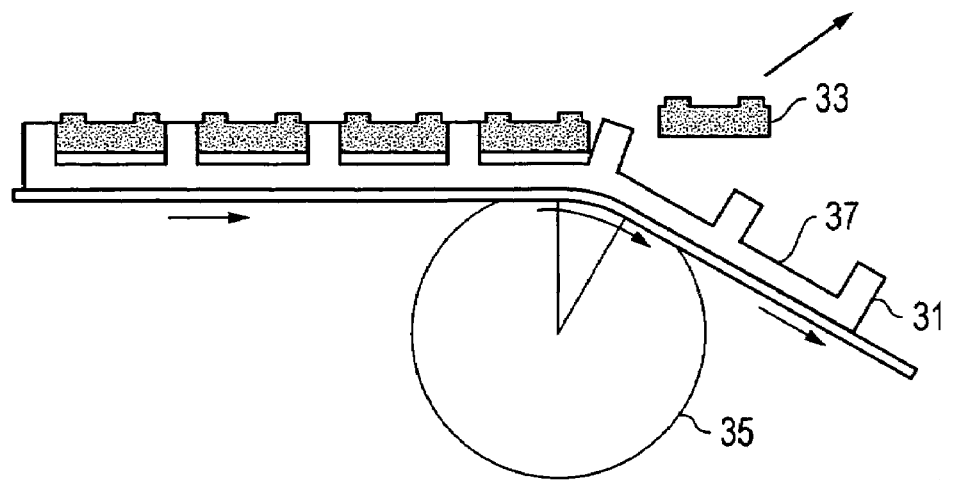
FIG. 8 is a side view of the process of FIG. 1 showing solvent removal and debond.
Figure 9:
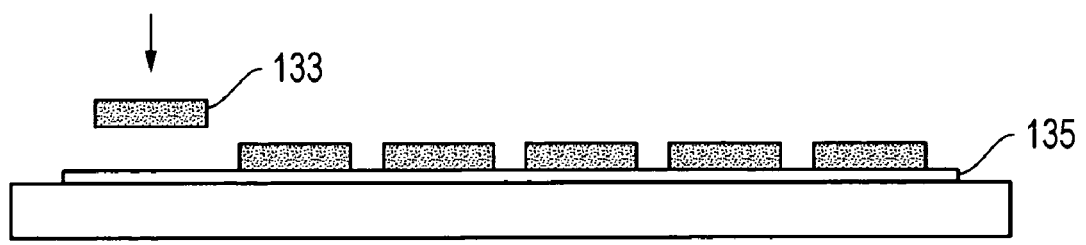
FIG. 9 is a side view of another embodiment of a slider process showing a first step of assembling and fluorinating rows/individual sliders and is constructed in accordance with the present invention.

Referring now to FIG. 5, the method includes performing spincoat and projection lithography 45/47 on the workpieces 33, which may comprise UV molding or liquid resist. The resist is developed (FIG. 6), and the workpieces 33 are patterned (FIG. 7) to form structural features 51 on the workpieces 33. This may comprise resistive ion etching and ion milling the workpieces 33. In the final step, the fixture 31 is elastically deformed to release and debond the workpieces 33.

In the first and last steps, the present invention comprises bending the fixture 31 about the cylinder 35 to open and close pockets 37, respectively, for the workpieces 33. The fixture 31 may be re-used to process additional workpieces, or discarded after a single use of processing the workpieces. Moreover, the fixture 31 may be used during both a lapping process and the patterning step, and can be used to hold the workpieces 33 while allowing gimbal, electrical connection, actuation, patterning, and mechanical release. Mechanical stability for the fixture 31 and workpieces 33 is provided through large area bonding over entire contact surfaces thereof.

Figure 10:
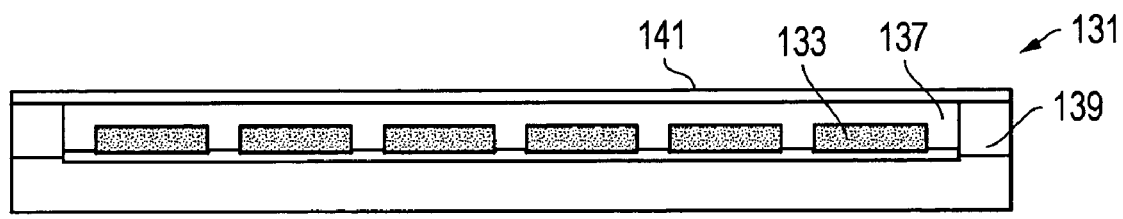
FIG. 10 is a side view of the process of FIG. 9 showing mold/cure of a gripper.
Figure 11:
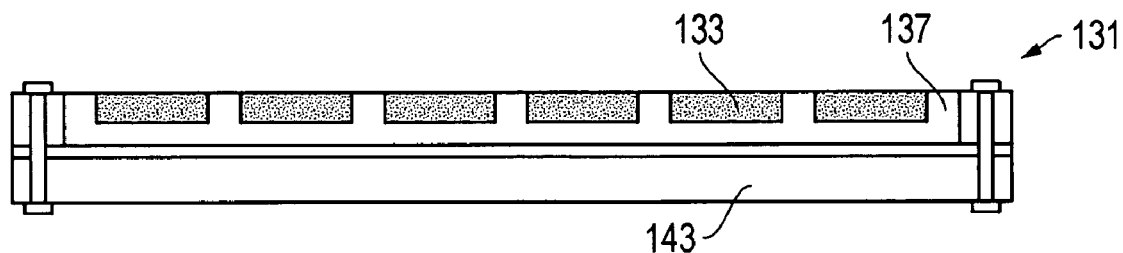
FIG. 11 is a side view of the process of FIG. 9 showing mounting to a carrier.
Figure 12:
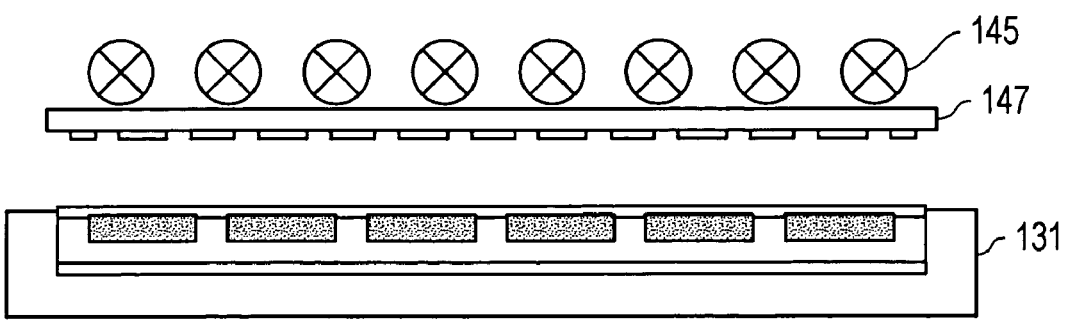
FIG. 12 is a side view of the process of FIG. 9 showing spincoat and projection lithography or UV molding lithography.
Figure 13:
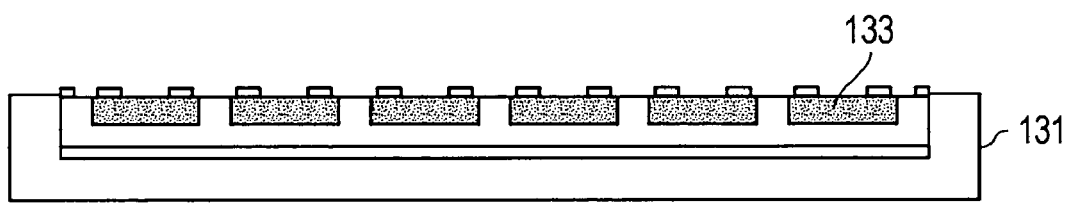
FIG. 13 is a side view of the process of FIG. 9 showing development of resist.
Figure 14:
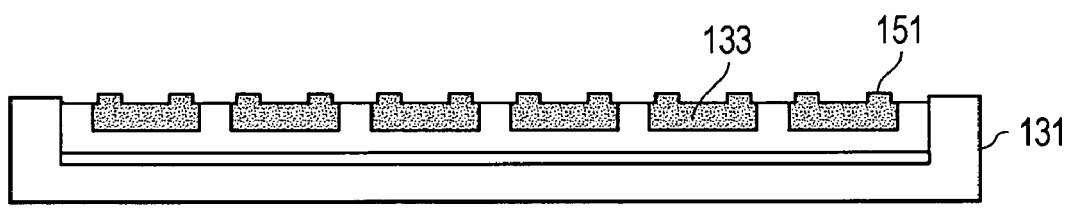
FIG. 14 is a side view of the process of FIG. 9 showing further processing.

FIGS. 9-15 illustrate an alternate embodiment of the present invention. In this version, of processing workpieces 133 (FIG. 9), a fixture 131 is formed around an array of workpieces 133 that are positioned on a pad 135 (FIG. 10). A spacer 139 is added and a bendable back-plane 141 is used to form a mold. The mold formation may include injecting a thermal-curable or UV-curable PDMS. In the next step (FIG. 11), the mold is mounted to a carrier 143.

Figure 15:
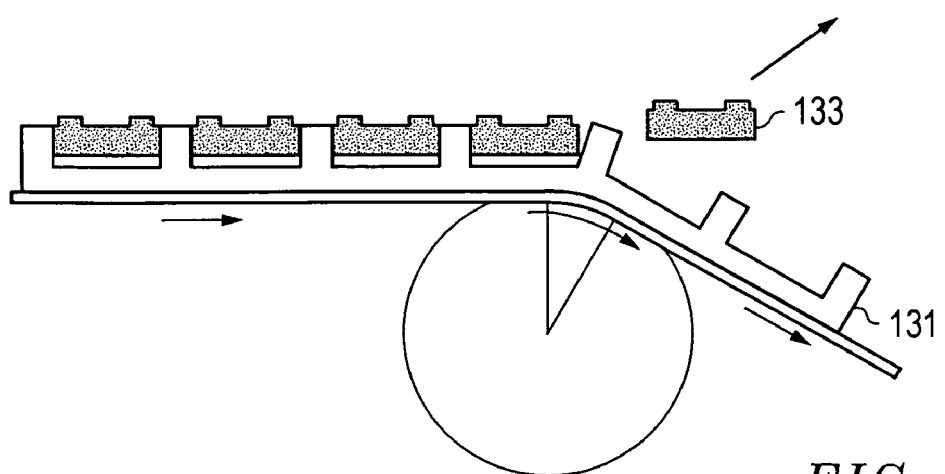
FIG. 15 is a side view of the process of FIG. 9 showing debond.
Figure 16:
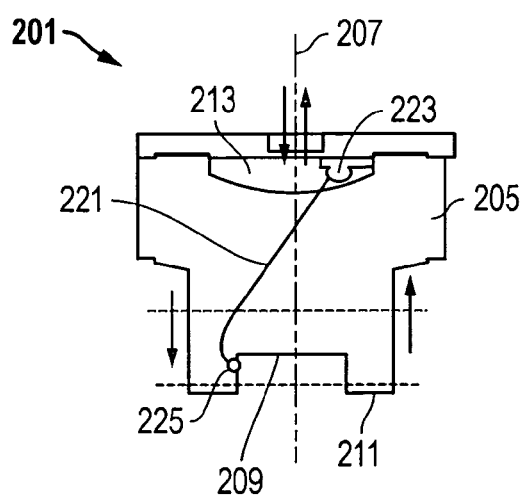
FIG. 16 is a side view of yet another embodiment of a slider handling mechanism showing actuation of a gripper and is constructed in accordance with the present invention.
Figure 17:
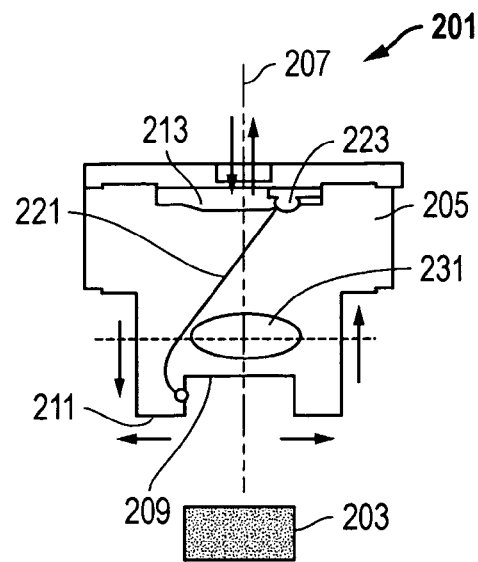
FIG. 17 is a side view of the mechanism of FIG. 16 showing opening of the gripper.
Figure 18:
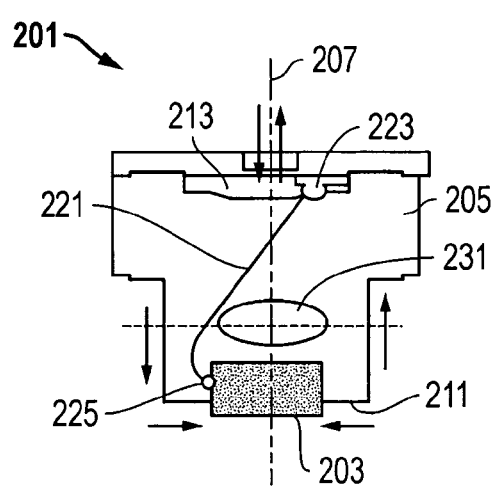
FIG. 18 is a side view of the process of FIG. 16 showing closing of the gripper.
Figure 19:
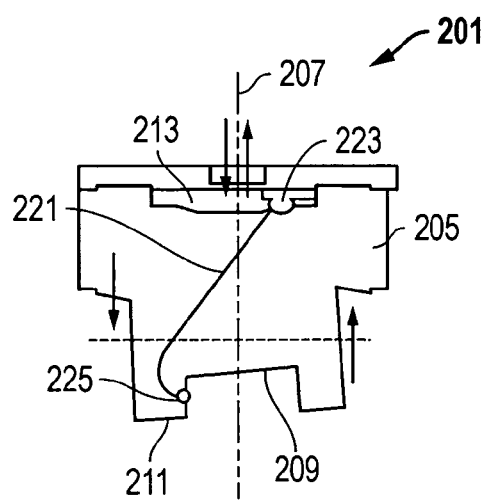
FIG. 19 is a side view of the process of FIG. 16 showing further actuation of the gripper.
Figure 20:
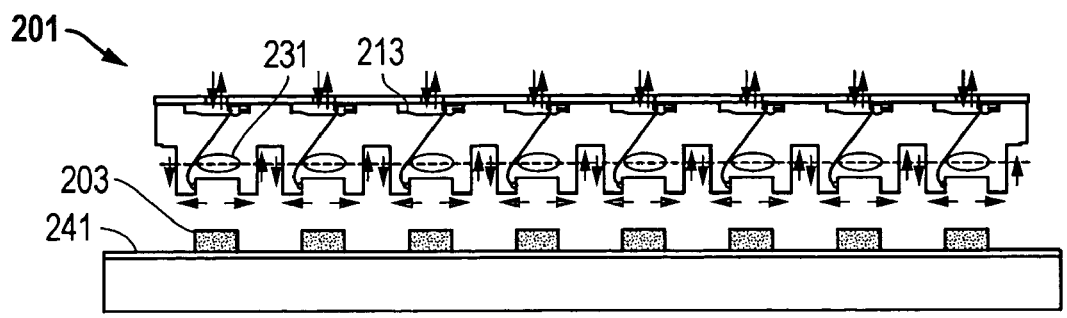
FIG. 20 is a side view of still another embodiment of a slider process showing a first step of solvent swelling to open grippers and is constructed in accordance with the present invention.

The invention then proceeds as described above for the previous embodiment, including spincoat and projection lithography 145/147 (FIG. 12), patterning the workpieces (FIG. 13), forming structural features 151 on the workpieces (FIG. 14), and then elastically deforming the fixture to release and debond the workpieces (FIG. 15). The workpieces 133 may be coated with a fluorinated monolayer by brief exposure to a fluorinated trichlorosilane compound, and the fixture can be molded from silicone rubber or PDMS. The other variations to the present invention are also described above for the previous embodiment.

Referring now to FIGS. 16-19, yet another embodiment of the present invention is shown as a fixture 201 for manipulating a workpiece 203. The fixture 201 has a body 205 with an axis 207 and a pocket 209 on one end for axially receiving the workpiece 203 into the pocket 209. The body 205 is preferably elastic and may be formed from silicone rubber or polydimethylsiloxane (PDMS), for example. A gripper 211 is formed adjacent the pocket 209 for gripping (FIG. 18) and releasing (FIG. 17) the workpiece 203. The gripper 211 may be actuated by a number of methods, including via swelling and evaporation of a solvent 231 (FIGS. 17-18), pneumatic actuation of a cavity 213, and electrical actuation. The gripper 211 is moved substantially tangential to the axis 207 to grip and release the workpiece 203.

The cavity 213 is formed in the body 205 for axial actuation and movement of the body 205 and workpiece 203. In the embodiment shown, the cavity 213 is formed in the body 205 axially opposite the pocket 209. In addition, an electrical circuit 221 is provided in the fixture 201 and gimbaling (FIG. 19) of the gripper 211 is achieved via an elasticity of the body 205. The electrical circuit 221 extends from the cavity connector 223 to the pocket 209. The electrical circuit 221 includes a first contact (cavity connector 223) in the cavity 213, and a second contact 225 in the gripper 211 for contacting the workpiece 203. As described above for the previous embodiments, the fixture 201 may be re-used to process additional workpieces 203, or discarded after a single use of processing only one workpiece 203.

Figure 21:
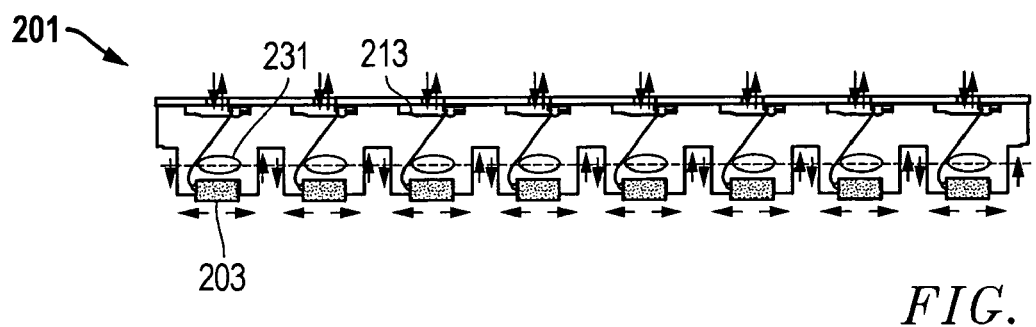
FIG. 21 is a side view of the process of FIG. 20 showing solvent evaporation and fixation of sliders.
Figure 22:
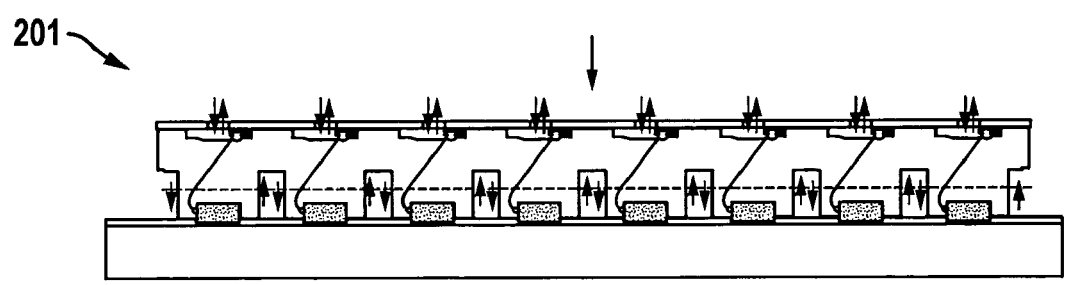
FIG. 22 is a side view of the process of FIG. 20 showing lapping.
Figure 23:
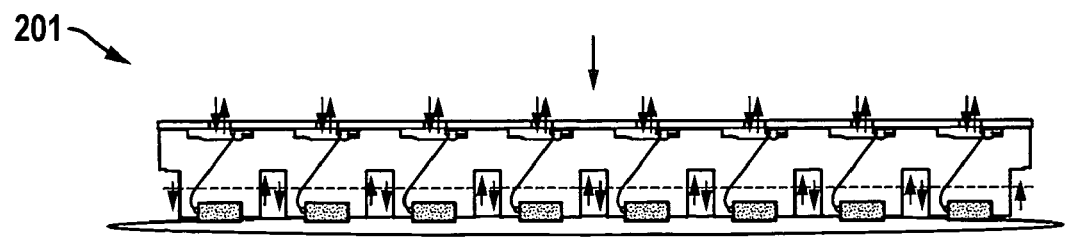
FIG. 23 is a side view of the process of FIG. 20 showing cleaning.
Figure 24:
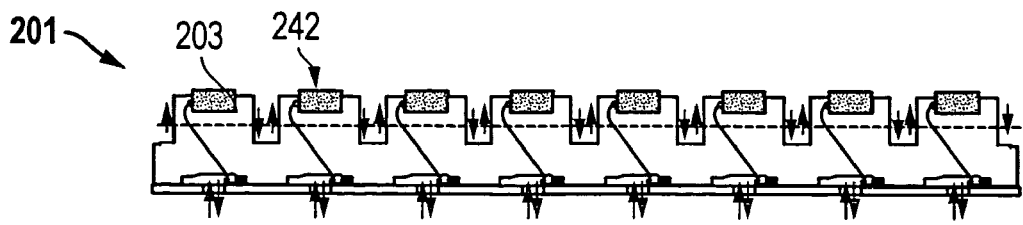
FIG. 24 is a side view of the process of FIG. 20 showing carbon overcoat.
Figure 25:
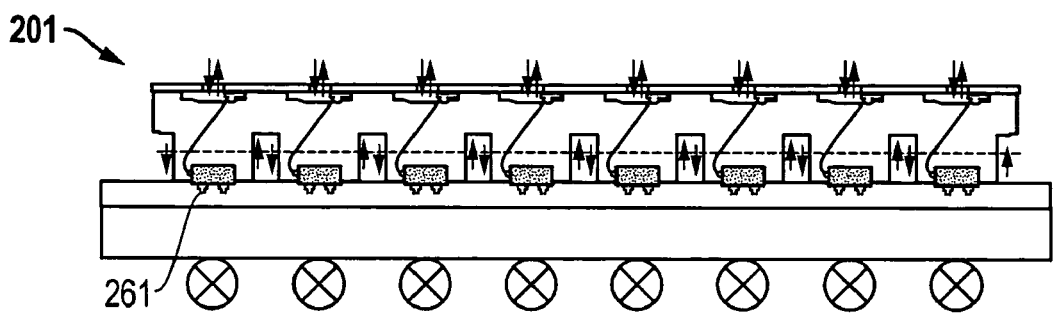
FIG. 25 is a side view of the process of FIG. 20 showing two-in-one UV-molding lithography.
Figure 26:
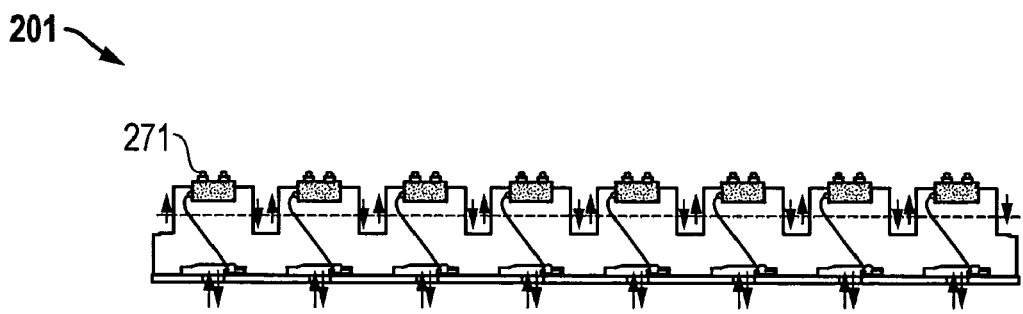
FIG. 26 is a side view of the process of FIG. 20 showing ion milling processing.
Figure 27:
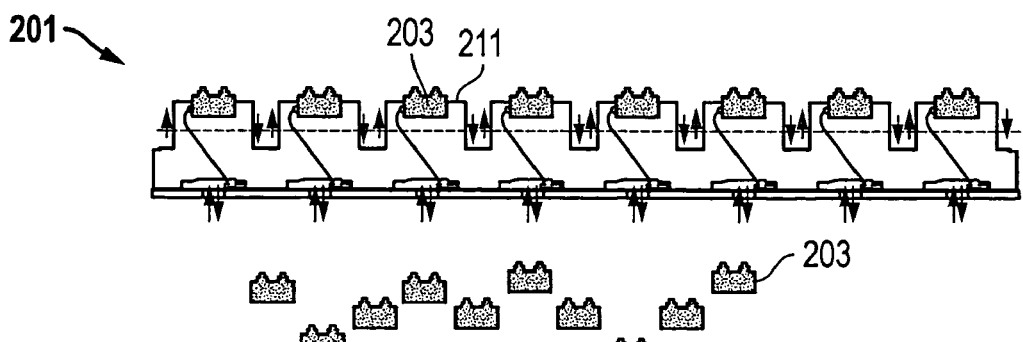
FIG. 27 is a side view of the process of FIG. 20 showing debond by solvent swelling.

Referring now to FIGS. 20-27, a process and method of processing workpieces 203 with an integrated plurality of the individual fixtures 201 is illustrated. The method comprises positioning an array of the workpieces 203 on an adhesive pad 241 (FIG. 20) and then gripping and retaining each of the workpieces with the fixture 201 having a plurality of grippers 211. As described above, the fixture 201 may be formed from silicone rubber or PDMS. The grippers 211 may be actuated by solvent 231 swelling to open the grippers 211 (FIG. 20) to receive the workpieces 203, and evaporating the solvent 231 to close the grippers 211 to engage the workpieces 203 (FIG. 21). Alternatively, the grippers 211 may be actuated by filling/venting the air chamber or cavity 213.

After the adhesive pad 241 is removed from the workpieces 203, the workpieces 203 may be lapped (FIG. 22) and cleaned (FIG. 23) while the workpieces 203 are in the fixture 201. In addition, the method may comprise applying a carbon overcoat 242 (FIG. 24) to the workpieces 203.

The remaining steps of the present embodiment essentially track those of the preceding embodiments, and include performing molding lithography on and patterning 261 the workpieces 203 (FIG. 25), such as UV molding or liquid resist; forming structural features 271 on the workpieces 203 (FIG. 26), such as reactive ion etching and ion milling the workpieces; and then debonding the workpieces from the fixture 201 (FIG. 27), which may comprise solvent swelling the fixture 201 to open the grippers 211 and release the workpieces 203. The method may also comprise re-using the fixture 201 to process additional workpieces 203, or discarding the fixture 201 after a single use of processing the workpieces 203.

The present invention has several advantages, including the ability to mechanically engage and release sliders during processing with silicone rubber or PDMS. These materials can take the function of a planarization material very much the same as other materials when variants of this material with well-defined mechanical properties are used. Mechanical debonding takes advantage of the rubber-elastic property of PDMS. The gripper is reusable and most advantageous in a virtually solvent-free, air bearing patterning UV-molding process, but it is also useful in classical resist-based processes as well. The fixture can mechanically hold sliders while allowing gimbaling, electrical connection, actuation, UV-molding or photolithography, and mechanical release, thus reducing the number of individual slider manipulations to two.

The present invention strongly reduces the cost associated with slider lapping and photo-patterning by reducing the number of manipulations. The invention also cures technical problems of the air bearing patterning process. In addition, the mechanical debonding process allows a complete removal of environmentally problematic solvents from the process. Mechanical stability of the assembly, given through large area bonding over the entire lower surface and over all lateral surfaces bonding, is strong enough to ensure the positional accuracy of the sliders and to ensure that the sliders cannot part from the assembly in unwanted moments.

The material has very high toughness to allow deformations as large as 100% without brittle failure. This can be used to create fixtures that strongly hold sliders while releasing them under mechanical action. The good holding force is created by the full area contact of the in-situ molded disposable gripper or the accurately manufactured mold for the reusable gripper. The economics for the fabrication of the disposable grippers are better than the current planarization process since the materials cost is lower and the overall effort is comparable to the current planarization process. An advantage of the fluorination of sliders is the reduced tendency for particle sticking on these surfaces. Importantly, the sliders can be removed by controlled peeling from the gripper without any remainder left on their surfaces. Surface treatment of sliders reduces the need for solvent cleaning or allows the selection of less harmful solvents. The concept described for the row grippers also can be extended to individual sliders in the same manner.

The extended PDMS fixture contains electrical contacts, can provide gimbal tolerance, and allows the design of the actuators. These complex fixtures carry out four basic functions, including gripping/releasing, actuation up/down, electrical contacting, and gimbaling. Molding the fixture from PDMS provides an easy path for miniaturization.

While the invention has been shown or described in only some of its forms, it should be apparent to those skilled in the art that it is not so limited, but is susceptible to various changes without departing from the scope of the invention.

What is claimed is:

1. A method of processing workpieces, comprising:
   molding a fixture from silicone rubber or poly-dimethylsiloxane (PDMS) such that the fixture is flexible, the fixture having pockets separated by ridges, wherein adjacent ones of the ridges define grippers for mechanically gripping workpieces;
   bending the fixture to open the grippers;
   positioning workpieces in the open pockets by elastically deforming the fixture, the workpieces being loaded into the fixture while it is elastically deformed;
   unbending the fixture to close the grippers such that the grippers mechanically grip the workpieces with the ridges and the workpieces are mechanically engaged by and mechanically retained in the pockets of the fixture;
   performing spincoat and projection lithography on surfaces of the workpieces;
   patterning the surfaces of the workpieces;
   forming structural features on the surfaces of the workpieces; and then
   elastically deforming the fixture to reopen the grippers to mechanically release and mechanically debond the workpieces from the pockets of the fixture.

2. The method of claim 1, further comprising processing the workpieces in a virtually solvent-free, air bearing patterning UV-molding process.

3. The method of claim 1, further comprising processing the workpieces in a resist-based process.

4. The method of claim 1, wherein the patterning step comprises UV molding of liquid resist.

5. The method of claim 1, wherein the forming step comprises reactive ion etching and ion milling the workpieces.

6. The method of claim 1, further comprising re-using the fixture to process additional workpieces.

7. The method of claim 1, further comprising discarding the fixture after a single use of processing the workpieces.

8. The method of claim 1, further comprising inflating an air chamber to improve the mechanical gripping of the workpieces by the fixture and fixation of the workpieces in the fixture.

9. A method of processing workpieces, comprising:
   molding a fixture from a template that is covered with a separation monolayer in a vapor of fluorinated trichlorosilanes;
   adding spacers;
   covering a portion of the fixture with a flexible backplane;
   injecting a liquid pre-polymer to create the fixture, the fixture comprising an elastic structure on the flexible backplane and having pockets separated by ridges, wherein adjacent ones of the ridges define grippers for mechanically gripping workpieces;
   bending the fixture to elastically deform the fixture to open the grippers and provide access to the pockets;
   loading workpieces into pockets of the fixture while it is elastically deformed
   unbending the fixture to close the grippers on the workpieces such that lower surfaces and side walls of the workpieces are mechanically engaged by the grippers of the fixture and the workpieces are mechanically retained in the fixture without obstructing upper surfaces of the workpieces;
   leveling the workpieces in the fixture by pushing them down in the pockets with a reference plane;
   performing spincoat and projection lithography on the upper surfaces of the workpieces;
   patterning the upper surfaces of the workpieces;
   forming structural features on the upper surfaces of the workpieces; and then
   elastically deforming the fixture to open the grippers and mechanically release and mechanically debond the workpieces from the pockets without having to remove adhesive from the workpieces.

10. The method of claim 9, wherein the providing step comprises molding the fixture from silicone rubber or poly-dimethylsiloxane (PDMS).

11. The method of claim 9, further comprising processing the workpieces in a virtually solvent-free, air bearing patterning UV-molding process.

12. The method of claim 9, further comprising processing the workpieces in a resist-based process.

13. The method of claim 9, wherein the patterning step comprises UV molding of liquid resist.

14. The method of claim 9, wherein the forming step comprises reactive ion etching and ion milling the workpieces.

15. The method of claim 9, further comprising re-using the fixture to process additional workpieces.

16. The method of claim 9, further comprising discarding the fixture after a single use of processing the workpieces.

17. The method of claim 9, further comprising using the fixture during both a lapping process and the patterning step, and holding the workpieces while allowing gimbaling, electrical connection, actuation, and mechanical release.

18. A method of processing workpieces, comprising:
    forming a fixture around an array of workpieces positioned on a pad by coating the workpieces with a fluorinated monolayer by brief exposure to a fluorinated trichlorosilane compound and molding the fixture from silicone rubber or poly-dimethylsiloxane (PDMS);
    adding a spacer and a bendable backplane to form a mold by injecting a thermal-curable or UV-curable PDMS;
    mounting the mold to a carrier;
    using the fixture during both a lapping process of the workpieces and a patterning process of the workpieces, and holding the workpieces while allowing gimbaling, electrical connection, actuation, and mechanical release;
    performing spincoat and projection lithography on the workpieces;
    patterning the workpieces with UV molding of liquid resist;
    forming structural features on the workpieces by reactive ion etching and ion milling the workpieces;
    (g) elastically deforming the fixture to mechanically release and mechanically debond the workpieces from the fixture by bending the fixture to open grippers for removal of the workpieces from pockets in the fixture; and then
    discarding the fixture after a single use of lapping and patterning the workpieces.

19. The method of claim 18, further comprising processing the workpieces in a virtually solvent-free, air bearing patterning UV-molding process.

20. A method of processing workpieces, comprising:
positioning an array of workpieces on an adhesive pad;
forming a fixture from silicone rubber or PDMS, the fixture having ridges and pockets defined between adjacent ones of the ridges, wherein adjacent pairs of the ridges also define grippers;
introducing a solvent into the ridges to mechanically open the grippers and expose the pockets;
placing workpieces into the open pockets;
evaporating the solvent from the ridges to mechanically close the grippers on the workpieces while leaving upper surfaces of the workpieces exposed;
removing the adhesive pad from the workpieces;
lapping and cleaning the workpieces;
applying a carbon overcoat to the workpieces;
performing molding lithography on and patterning the workpieces by UV molding or liquid resist;
forming structural features on the workpieces on tops of the workpieces by reactive ion etching and ion milling the workpieces; and then
reintroducing the solvent into the ridges to mechanically reopen the grippers and mechanically release and mechanically debond the workpieces from the pockets in the fixture.

21. The method of claim 20, further comprising re-using the fixture to process additional workpieces.

22. The method of claim 20, further comprising discarding the fixture after a single use of processing the workpieces.

* * * * *